(12) United States Patent
Kessler et al.

(10) Patent No.: US 10,812,568 B2
(45) Date of Patent: *Oct. 20, 2020

(54) GRAPHICAL USER INTERFACE FACILITATING UPLOADING OF ELECTRONIC DOCUMENTS TO SHARED STORAGE

(71) Applicant: Microsoft Technology Licensing, LLC, Redmond, WA (US)

(72) Inventors: Jade Kessler, Cambridge, MA (US); Ryan Shaffer, Cambridge, MA (US); Benjamin Wilde, Quincy, MA (US); Juliana Cherston, Cambridge, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/185,160

(22) Filed: Nov. 9, 2018

(65) Prior Publication Data
US 2019/0141115 A1    May 9, 2019

Related U.S. Application Data

(63) Continuation of application No. 14/788,761, filed on Jun. 30, 2015, now Pat. No. 10,154,078.

(51) Int. Cl.
*G06F 3/0481* (2013.01)
*H04L 29/08* (2006.01)
*G06F 3/0484* (2013.01)

(52) U.S. Cl.
CPC .......... *H04L 67/06* (2013.01); *G06F 3/04842* (2013.01); *H04L 67/1097* (2013.01); *H04L 67/125* (2013.01)

(58) Field of Classification Search
CPC ... H04L 67/06; H04L 67/1097; H04L 67/125; G06F 3/04842
See application file for complete search history.

(56) References Cited

U.S. PATENT DOCUMENTS 8,856,907 B1    10/2014  Tidd
9,413,587 B2     8/2016  Smith et al.
(Continued)

OTHER PUBLICATIONS

Carta, Doriano Paisano., "5 Ways to Collaborate on Documents Online in Real Time", Retrieved from https://mashable.com/2009/02/21/online-document-collaboration/, Feb. 21, 2009, 8 Pages.
(Continued)

*Primary Examiner* — Jennifer N To
*Assistant Examiner* — Amy P Hoang
(74) *Attorney, Agent, or Firm* — NovoTechIP International PLLC (57) ABSTRACT

In an end user application running on a computer, for the purpose of collaborative modification of shared electronic documents, a graphical user interface is provided that facilitates storing an electronic document in shared storage. This graphical user interface includes a graphical element that conveys information about shared status of the currently accessed electronic document to the end user. Through input devices of the end user computer, an end user can manipulate this graphical element. Certain manipulations of this graphical element instruct the end user computer to store the currently accessed electronic document in shared storage if that electronic document has not yet been stored in shared storage. After the electronic document is stored in shared storage, the graphical user interface facilitates sharing of the electronic document with others. A graphical user interface that allows an electronic document to be quickly shared improves user efficiency and productivity in collaborative authoring.

19 Claims, 6 Drawing Sheets

(56) References Cited

U.S. PATENT DOCUMENTS

| | | | |
|---|---|---|---|
| 10,044,773 | B2 | 8/2018 | Destagnol et al. |
| 2008/0095373 | A1 | 4/2008 | Nagata et al. |
| 2009/0260060 | A1* | 10/2009 | Smith .................... G06Q 10/10 |
| | | | 726/3 |
| 2014/0156594 | A1* | 6/2014 | Kuo ........................ G06F 16/10 |
| | | | 707/620 |
| 2015/0288756 | A1* | 10/2015 | Larabie-Belanger ........................ |
| | | | H04L 67/1095 |
| | | | 715/753 |
| 2016/0028806 | A1* | 1/2016 | Wareing ............. H04L 67/1021 |
| | | | 709/217 |
| 2018/0260100 | A1 | 9/2018 | Kessler |
| 2019/0369844 | A9 | 12/2019 | Kessler |

OTHER PUBLICATIONS

"Final Office Action Issued in U.S. Appl. No. 15/454,837", dated May 6, 2019, 23 Pages.

"Non Final Office Action Issued in U.S. Appl. No. 15/454,837", dated Aug. 8, 2019, 23 Pages.

"Final Office Action Issued in U.S. Appl. No. 15/454,837", dated Dec. 30, 2019, 22 Pages.

\* cited by examiner

GRAPHICAL USER INTERFACE FACILITATING UPLOADING OF ELECTRONIC DOCUMENTS TO SHARED STORAGE

CROSS-REFERENCE TO RELATED APPLICATIONS

This application is a continuation application of U.S. patent application Ser. No. 14/788,761, entitled "Graphical user interface facilitating uploading of electronic documents to shared storage", filed Jun. 30, 2015, now U.S. Pat. No. 10,154,078, issued Dec. 11, 2018.

BACKGROUND

The availability of shared storage systems for electronic documents has increased the ability of computer end users to share and collaborate in the creation of a variety of electronic documents. End users can cause electronic documents to be stored in shared storage systems on a computer network, such as the internet. End users can instruct such a shared storage system to allow electronic documents to be shared with other end users of the shared storage system. A shared storage system generally has an access control component in a file system that tracks the access rights users have for each electronic document. In many typical end user scenarios, an end user may create and store an electronic document in local storage on an end user computer, and then upload the electronic document to the shared storage system. Storing the electronic document in a shared storage system can be accomplished on the end user computer, for example, by using a "save as" operation of an application, or a file move or copy operation of a file system, or an upload operation of a client application of the shared storage system, to store the electronic document directly in the shared storage system or in a directory of the end user computer file system which is synchronized with the shared storage system.

After an electronic document has been shared with two or more end users, the shared storage system manages access to the shared electronic document to ensure consistency of the electronic document, especially in the case of collaborative modifications to the electronic document. A kind of collaboration system, typically resident on a server computer that is configured to access the file system of the shared storage system, typically is involved in managing this collaborative modification by tracking which users currently are accessing an electronic document.

SUMMARY

This Summary is provided to introduce a selection of concepts in a simplified form that are further described below in the Detailed Description. This Summary is intended neither to identify key or essential features, nor to limit the scope, of the claimed subject matter.

An end user application running on a computer, for the purpose of collaborative modification of shared electronic documents, is configured to provide a graphical user interface that facilitates storing an electronic document in shared storage. This graphical user interface includes a graphical element that conveys information about shared status of the currently accessed electronic document to the end user. Through input devices of the end user computer, an end user can manipulate this graphical element. In response to certain manipulations of this graphical element, the end user computer stores the currently accessed electronic document in shared storage if that electronic document has not yet been stored in shared storage. After the electronic document is stored in shared storage, the graphical user interface is further configured to facilitate sharing of the electronic document with others. A computer with a graphical user interface that allows an electronic document to be quickly shared improves user efficiency and productivity in collaborative authoring.

In the following description, reference is made to the accompanying drawings which form a part hereof, and in which are shown, by way of illustration, specific example implementations of this technique. It is understood that other embodiments may be utilized and structural changes may be made without departing from the scope of the disclosure.

DETAILED DESCRIPTION

Figure 1:
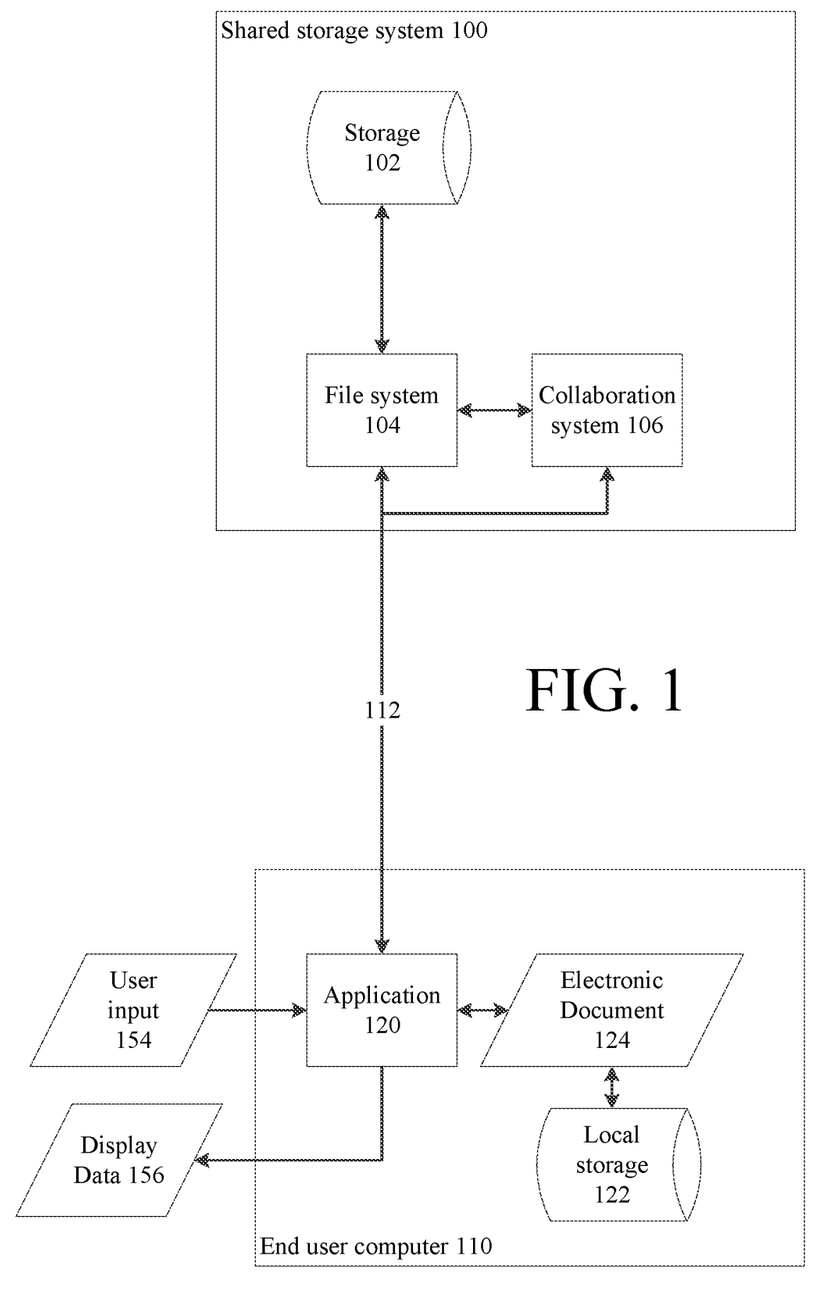
FIG. 1 is a block diagram of an example computer system configured to share electronic documents among users.

FIG. 1 is a block diagram of an example computer system configured to support sharing and collaborative modification of electronic documents by multiple end users using multiple end user computers.

A computer system that is configured to support sharing and collaborative modification of electronic documents by multiple end users includes a shared storage system 100. The shared storage system 100 generally includes storage 102 in which data is stored in data files accessible through a file system 104 that is part of the shared storage system. The file system configures a server computer to maintain information about each file stored in storage 102. The shared storage system 100 can be implemented using one or more general purpose computers, such as described in connection with FIG. 6, and configured to implement a server computer that is responsive to requests over a computer network to access, through the file system, files on the storage 102.

Multiple end user computers 110 are connected to the shared storage system for communication over a computer network 112, such as the internet. An end user computer 110 can be a computer such as described in connection with FIG. 6 and configured as an end user computer running one or more applications 120. Examples of such a computer include, but are not limited to, a tablet computer, a slate computer, a notebook computer, a desktop computer, a virtual desktop computer hosted on a server computer, a handheld computer, and a mobile phone including a computer and applications. The computer network 112 can be any computer network supporting interaction between the end user computers and the shared storage system, such as a local area network or a wide area network, whether private and/or publicly accessible, and can include wired and/or wireless connectivity. The computer network can be implemented using any of a number of available network communication protocols, including but not limited to Ethernet and TCP/IP.

An end user computer 110 includes one or more applications 120. An application is a computer program executed on the end user computer that configures the computer to be responsive to user input 154 to allow an end user to interactively modify an electronic document 124. An electronic document can include any kind of data, such as text, still images, video and audio. The application processes the electronic document, in response to user input through input devices, by selecting and combining portions of data to create the content of the electronic document, by displaying or otherwise presenting display data 156, such as a graphical user interface including the content the electronic document, through output devices (not shown) to the end user, and by storing the electronic document in memory and/or in a data file in storage of the end user computer.

A variety of kinds of applications can be used on an end user computer. Examples of an application include, but are not limited to, a word processing application, a presentation application, a note taking application, a text editing application, a paint application, an image editing application, a spreadsheet application, a desktop publishing application, a drawing application, a video editing application, and an audio editing application.

An application generates an electronic document that is stored in a data file. Such a data file can be stored in local storage 122 and/or the shared storage system 100. The electronic document, while being modified by an end user on the end user computer, also is temporarily stored in memory on the end user computer.

When an electronic document is stored in a data file in the shared storage system 100, the file system 104 of the shared storage system includes information indicating a sharing state of the electronic document. Such information can be in the form of access controls indicating which end users are authorized to access the electronic document. The file system also can be configured to be responsive to a query to provide this information to another application, such as application 120 on an end user computer. An end user can view and modify the sharing state of an electronic document in a number of ways.

If an electronic document is stored in a data file in the shared storage system 100, and the data file is shared, with modification rights, with at least one more end user, then two or more end user computers may access and attempt to modify the electronic document. To handle such a condition, the shared storage system can include a kind of collaboration system 106. The collaboration system 106 is a computer program that configures the server computer to manage access to shared electronic documents in the shared storage system 100.

The collaboration system 106 is configured to store information about end users that are currently accessing the electronic document. The collaboration system can be configured to be responsive to a query to provide this information to another application on an end user computer, such as application 120.

Using the information about end users currently accessing an electronic document, the collaboration system can implement any of a number of different techniques for coordinating access to the electronic document to ensure consistency of the electronic document. For example, the collaboration system can prevent one user from writing to the data file for the electronic document while another user has the data file open for writing. As another example, the collaboration system can interactively merge changes to the electronic document as such changes are being made collaboratively by multiple users. In such a case, the collaboration system merges changes received from end user computers in memory local to the collaboration system, and then transmits a modified version of the electronic document to each end user computer with an application currently accessing the electronic document.

Having now described the computer system in which an application on an end user computer can be used to interactively modify a shared electronic document, more details of the application will now be described.

Figure 2:
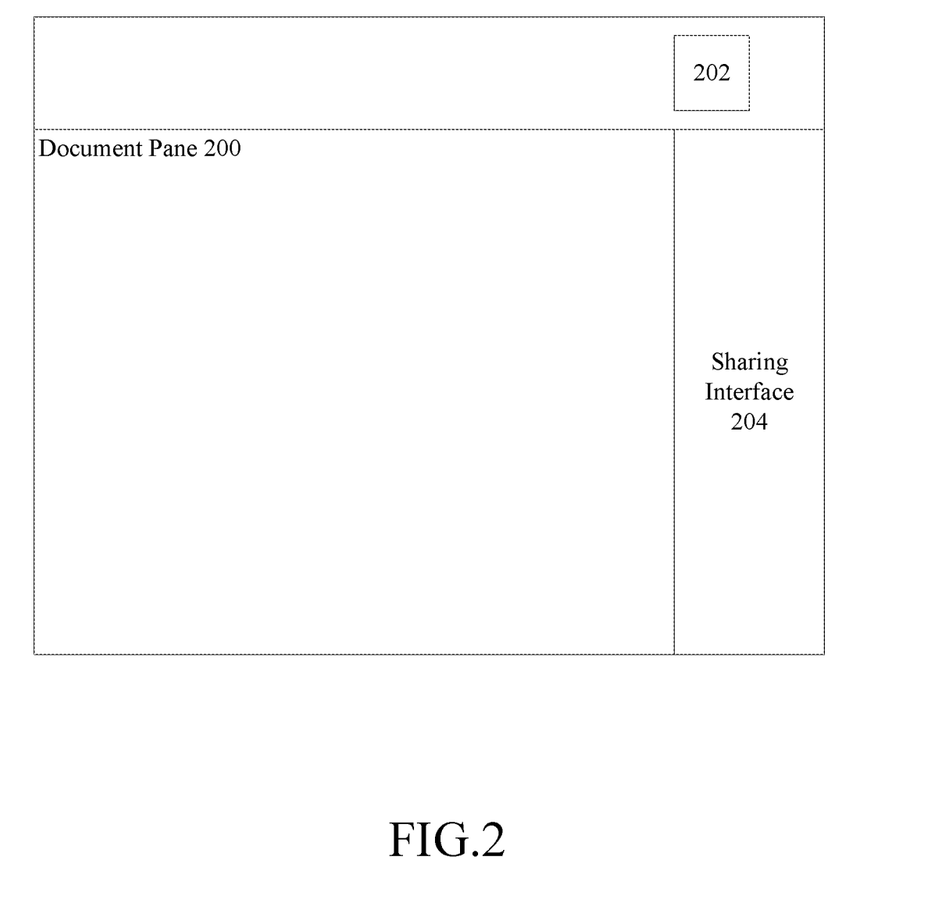
FIG. 2 an example graphical user interface for an application configured to enable a user to share an electronic document with another user.

In FIG. 2, an example graphical user interface for the application is shown. In this example graphical user interface, a document pane 200 is a primary display area in which the electronic document is presented on a display. The end user computer receives user inputs through input devices, and can associate such inputs with operations with respect to the electronic document in document pane 200, or with respect to other graphical elements in the graphical user interface. The end user computer processes some user inputs to effect modifications to the electronic document currently being accessed in the document pane 200.

The graphical user interface for the application in FIG. 2 also includes a graphical element 202 that conveys to the user sharing status information for the electronic document being edited. In one implementation, the application can dynamically update the graphical element during editing to indicate both current sharing and current co-authoring status of the currently accessed electronic document. An example of such an implementation is described in co-pending application entitled "Graphical User Interface Facilitating Sharing and Collaborative Editing of Electronic Documents", by Benjamin Wilde et al., and filed on even date herewith, which is hereby incorporated by reference.

Through one or more input devices of the end user computer, an end user can provide inputs to manipulate this graphical element. The end user computer is configured to process such inputs to perform various operations, such as to instruct the end user computer to present further detailed information about the sharing status of the electronic document and to change such status. For example, the application can display, in response to manipulation of this graphical element, a sharing interface 204, as part of the graphical user interface.

As shown in FIG. 2, as an example, the sharing interface 204 in the graphical user interface can be used to present information about the sharing status and the current use of the currently accessed electronic document. The graphical user interface also provides a mechanism through which such information can be modified. This sharing interface is presented in the context of the currently accessed electronic document, i.e., the sharing interface 204 and the document pane 200 are both displayed in the graphical user interface simultaneously. As an example, in FIG. 2 the sharing interface is illustrated as a pane of the graphical user interface which is non-overlapping and non-modal with the other panes of the interface. The sharing interface 204 also can be implemented using other graphical user interface techniques, such as a modal dialog box, a call-out interface, or small pop-up window also are examples of a kind of interface that can be shown in the context of the currently accessed electronic document.

To generate the sharing interface, an application uses an identifier of the electronic document being edited, such as a file name, to access information about its sharing status. In some instances, the electronic document may already be stored in the shared storage system 100. Optionally, other information about co-authoring state also can be obtained from the collaboration system.

However, in some instances, the currently accessed electronic document resides only in local storage 122, whether in a data file or in memory. In such an instance, in response to activation of the sharing interface 204, the sharing interface prompts the user through steps for sharing the electronic document through the shared storage system, as will now be described in more detail below in connection with FIGS. 3 through 5.

Figure 3:
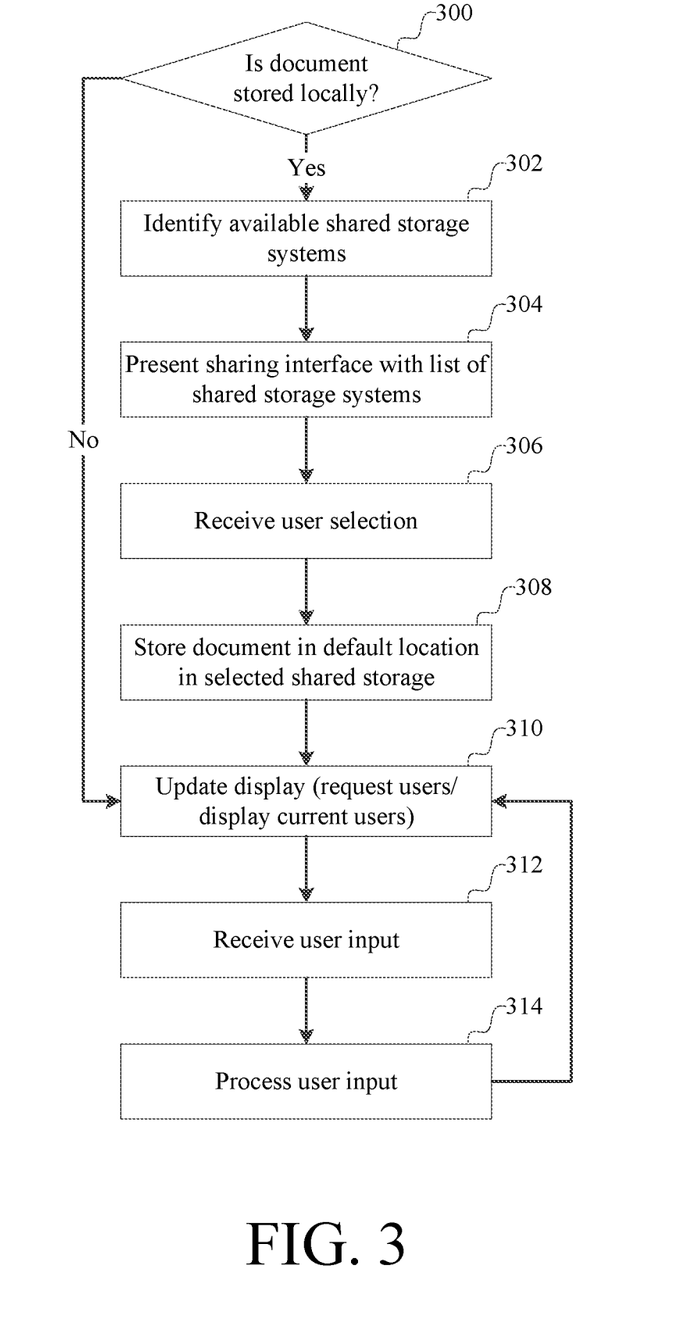
FIG. 3 is a flow chart describing an example operation of an application with a graphical user interface with a sharing interface.

In FIG. 3, an example implementation of operation of the application is illustrated. The application determines 300 if the currently accessed electronic document is stored in a supported shared storage system, or is stored in local storage or other form of storage, or in a format, that is otherwise not a supported shared storage system. If the electronic document is, for example, in local storage, then the application identifies 302 which shared storage systems are available.

The application can identify available shared storage systems in many ways. For example, the end user computer may have another application that maintains information about accounts to which the end user computer is currently connected.

Figure 4:
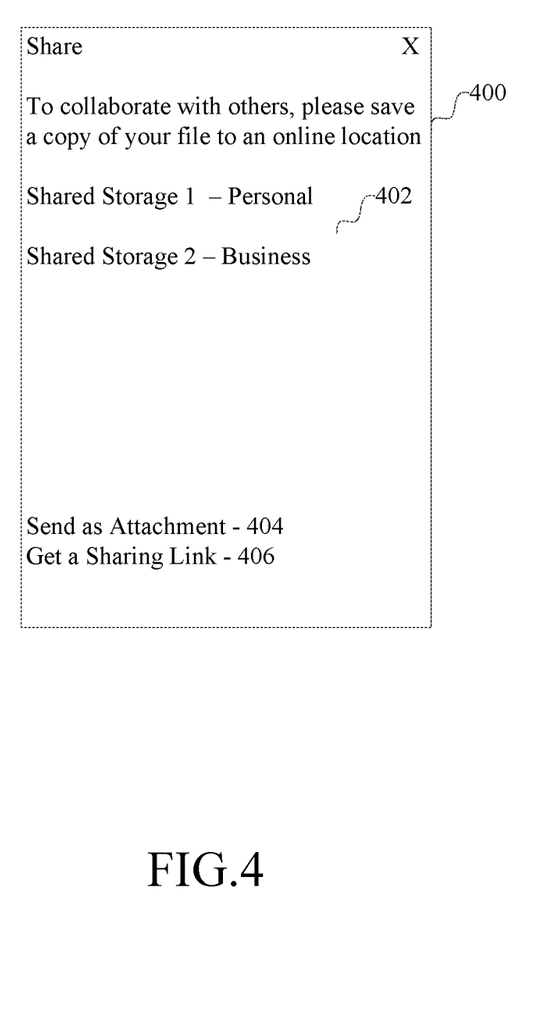
FIG. 4 is an example graphical user interface for an application with a sharing interface.

A list of the available shared storage systems is presented 304 in the sharing interface, an example of which is in FIG. 4, with a prompt to the user to select one of the shared storage systems. The application then can receive 306 a user selection of one of the shared storage systems. The electronic document is then stored in this end user's account in the shared storage system. A default location, such as a root directory or other designated directory, can be used to store the electronic document.

The file system of the shared storage system, or the application, can be configured to automatically resolve a naming conflict between a file name used for the currently accessed electronic document and any other electronic documents in the directory. The application can be configured to provide, to the file system, a file name for an electronic document. Alternatively, the file system can be configured to provide a default file name for the electronic document. In response to an attempt to create or open a new file for write access, given the file name for the electronic document, the file system signals an error if there is any naming conflict. In response to any naming conflict, the application or the file system can be configured to automatically resolve the conflict, i.e., without prompting the user or other kind of further user interaction or intervention. For example, a number or other characters can be appended to the file name until the naming conflict is overcome. By automatically addressing the naming conflicts, the application can store the electronic document directly in the shared storage system without further user interaction or intervention.

After the electronic document is stored in the shared storage system, the application modifies its context for editing the electronic document. In particular, prior to sharing the electronic document, the application referenced a local copy of the electronic document in memory and/or in a file in local storage. A local file may have been open for write access. The application can close any local file and then changes its context to indicate that the electronic document being editing in local memory is from the shared storage system.

Figure 5:
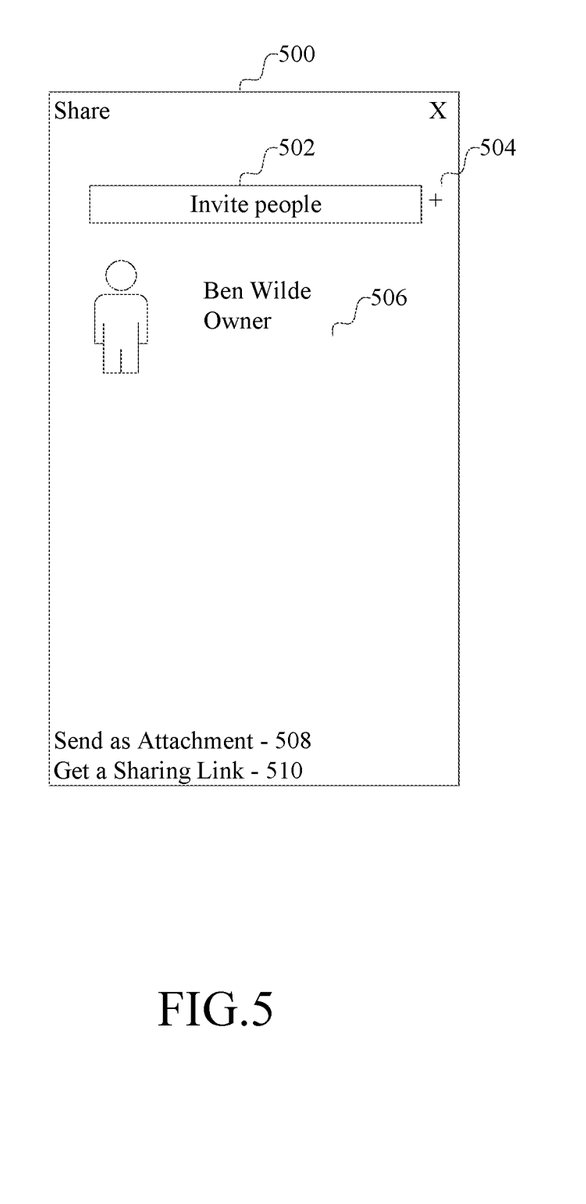
FIG. 5 is an example graphical user interface for an application with a sharing interface.

After the electronic document is successfully stored in the shared storage system, the content of the sharing interface can be updated 310, such as shown in FIG. 5. The updated sharing interface can prompt the end user, for example, for a user identifier for any end user with whom the electronic document is to be shared. Such a user identifier can include, for example, an electronic mail (e-mail) address, instant messaging address, other contact information, or a username. In response to any user input received 312 through this sharing interface, such as the selection of a user, input of a user identifier, or selection of an alternate way of sharing the electronic document, the input is then processed 314, and the sharing interface is updated 310. This cycle can repeat indefinitely until an event occurs, in response to which the sharing interface is closed.

Turning now to FIGS. 4 and 5, an example implementation of the sharing interface, as a non-overlapping pane adjacent to a document pane, will now be described. In FIG. 4, an example initial state of the sharing interface is shown. In this state of the sharing interface, which can be shown if the electronic document is not yet in shared storage, the sharing interface includes a prompt 400, and any number of indications 402 of shared storage systems to which the application currently has access. The sharing interface also can include other prompts 404 and 406 from which a user can select other ways to share, such as by sending the file as an attachment in an electronic message or by sending a link to the file.

In FIG. 5, another example state of the sharing interface is shown at 500. In this state of the sharing interface, which can be shown after an electronic document has been stored in shared storage, the sharing interface permits a user to identify other users with whom to share the electronic document.

In FIG. 5, the sharing interface includes an input box 502 in which a user can enter, and through which the computer interactively displays, a user identifier, such as a user name, an email address, or other contact information, to identify a user with whom the electronic document is to be shared. Another graphical element, such as the "+" symbol shown at 504, is configured to be manipulated by an end user, in response to which the user identified in the input box 502 is added to the sharing for the electronic document. Any number of users can be added in this manner.

Information describing the users with which the electronic document is shared can be shown at 506. A user identifier, such as a user name and/or picture, and a status, such as "owner", "co-author", or "shared" can be displayed. In this example in FIG. 5, the electronic document has not yet been shared, as there is only one user, the owner, which is listed. The information about the users with which an electronic document is shared can be presented in an order based on sorting information the users, such as the user's status or other information. For example, the owner can be shown first, followed by current co-authors, followed by other users with whom the electronic document is shared, but who are currently not accessing the document.

This state of the sharing interface in FIG. 5 also can include other prompts 508 and 510 from which a user can select other ways to share, such as by sending the file as an attachment in an electronic message or by sending a link to the file.

It should be understood that the foregoing description is merely an example of implementations of such a sharing interface and that the sharing interface can provide yet additional functionality and can have several implementations.

It should be understood that the foregoing description is merely an example of an implementation of a computer system configured to support collaborative modification of electronic documents stored in a shared storage system.

By having an application provide a graphical user interface that allows an electronic document to be quickly shared through a shared storage system, user efficiency and productivity in collaborative modification of electronic documents is improved. Such a graphical user interface facilitates access to the shared storage system and shared status of an electronic document.

Accordingly, in one aspect a computer comprises a processing system comprising one or more processing units and storage, and a network interface configured to connect the computer to computer network. The computer network is connected to a shared storage system, the shared storage system comprising a file system configured to store a plurality of electronic documents and to make the plurality of electronic documents available to a plurality of users. The storage of the processing system comprises computer program code that, when executed by the processing system, configures the processing system to be comprising an application. The application is configured to process user input to modify an electronic document. The application further comprises a graphical user interface including a document pane configured to display the electronic document and a graphical element representing sharing status. The application is further configured to display, in response to the electronic document not being stored in a shared storage system and in response to a selection of the graphical element to share the electronic document, a sharing interface in the graphical user interface adjacent to the document pane. The sharing interface displays available shared storage systems to store the electronic document.

In another aspect an article of manufacture comprises at least one computer storage medium comprising at least one of a memory device and a storage device, with computer program instructions stored on the at least one computer storage medium. The computer comprises a processing system comprising one or more processing units and storage and a network interface configured to connect the computer to a computer network.

The computer network is connected to a shared storage system, the shared storage system comprising a file system configured to store a plurality of electronic documents and to make the plurality of electronic documents available to a plurality of users. The computer program instructions, when processed by a processing system of a computer, configure the processing system to be comprising an application configured to process user input to modify an electronic document. The application further comprises a graphical user interface including a document pane configured to display the electronic document and a graphical element representing sharing status. The application is further configured to display, in response to the electronic document not being stored in a shared storage system and in response to a selection of the graphical element to share the electronic document, a sharing interface in the graphical user interface adjacent to the document pane. The sharing interface displays available shared storage systems to store the electronic document.

In another aspect, a computer-implemented process comprises processing user input to modify an electronic document. The modified electronic document is displayed in a graphical user interface including a document pane configured to display the electronic document and a graphical element representing sharing status. In response to the electronic document not being stored in a shared storage system and in response to a selection of the graphical element to share the electronic document, a sharing interface is displayed in the graphical user interface adjacent to the document pane. The sharing interface displays information regarding any available shared storage systems to store the electronic document.

In another aspect, a computer comprises a graphical user interface for modifying an electronic document including a document pane configured to display the electronic document and a graphical element representing sharing status. In response to the electronic document not being stored in a shared storage system and in response to a selection of the graphical element to share the electronic document, a sharing interface is displayed in the graphical user interface adjacent to the document pane. The sharing interface displays information regarding any available shared storage systems to store the electronic document.

In any of the foregoing aspects, the application can be further configured, in response to selection of an available shared storage system, to store the electronic document in the shared storage system.

In any of the foregoing aspects, the application can be further configured to store the electronic document in a default directory in the shared storage system.

In any of the foregoing aspects, the application can be further configured to automatically resolve naming conflicts of the electronic document and other electronic documents stored in the shared storage system, such as in a default directory of the shared storage system.

In any of the foregoing aspects, the application can be further configured to interactively update the sharing interface in the graphical user interface with sharing status information for the currently accessed electronic document while the electronic document is accessed by the application and displayed in the graphical user interface.

In any of the foregoing aspects, the application can be further configured to prompt a user to enter, in the sharing interface, one or more user identifiers for one or more other users. The application can be further configured to receive the one or more user identifiers for the one or more other users for sharing the electronic document.

In any of the foregoing aspects, presenting of information in the sharing interface can include any conveyance of information through an output device of the computer, such as by display, audio output or other output to be perceived by an end user.

Any of the foregoing aspects may be embodied as a computer system, as any individual component of such a computer system, as a process performed by such a computer system or any individual component of such a computer system, or as an article of manufacture including computer storage in which computer program instructions are stored and which, when processed by one or more computers, configure the one or more computers to provide such a computer system or any individual component of such a computer system.

Figure 6:
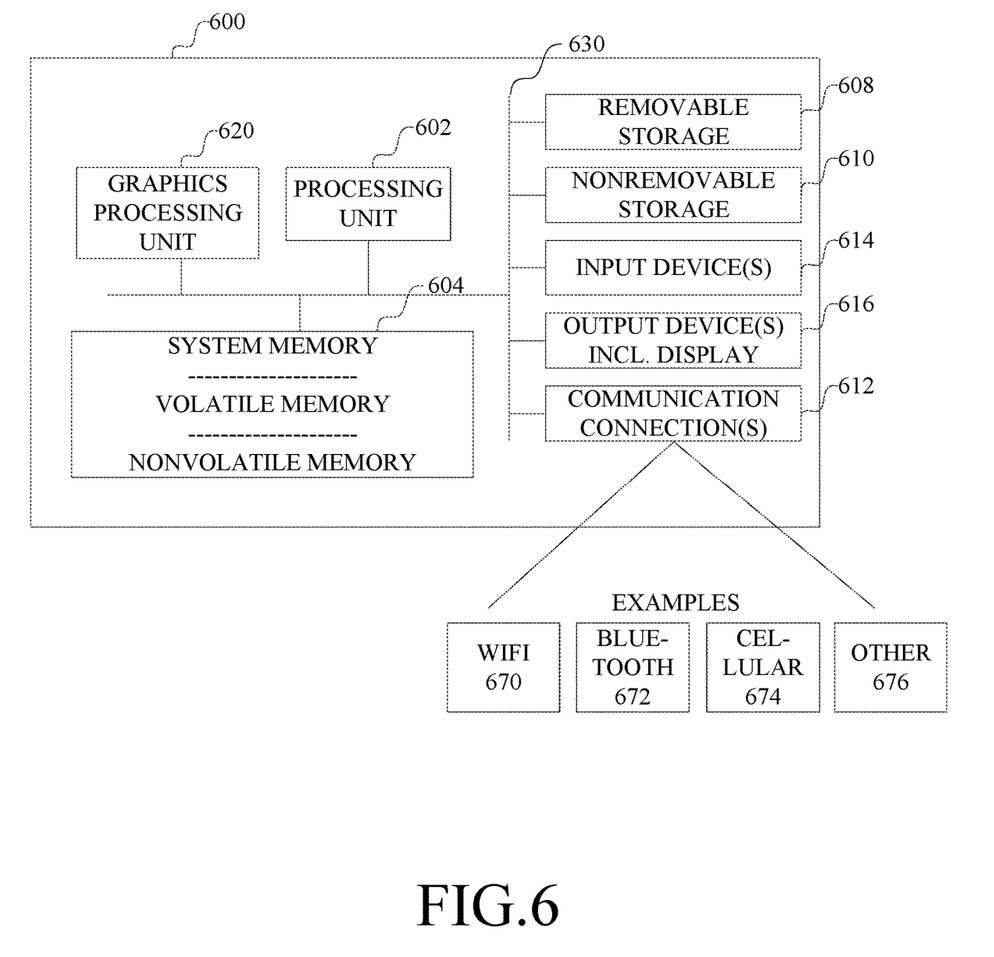
FIG. 6 is a block diagram of an example computer in which components of such a system can be implemented.

Referring to FIG. 6, an example implementation of a general purpose computer will now be described. A general purpose computer is computer hardware that is configured with computer programs providing instructions to be executed by one or more processors or other logic devices in the computer. Computer programs on a general purpose computer generally include an operating system and applications. The operating system is a computer program running on the computer that manages access to various resources of the computer by the applications and the operating system. The various resources generally include the one or more processors or logic devices, memory, storage, communication interfaces, input devices and output devices.

Examples of general purpose computers include, but are not limited to, personal computers, game consoles, set top boxes, hand-held or laptop devices (for example, media players, notebook computers, tablet computers, cellular phones, personal data assistants, voice recorders), server computers, multiprocessor systems, microprocessor-based systems, programmable consumer electronics, networked personal computers, minicomputers, mainframe computers, and distributed computing environments that include any of the above types of computers or devices, and the like.

FIG. 6 illustrates an example of computer hardware for a computer. An example computer 600 includes at least one processing unit 602 and memory 604. The computer can have multiple processing units 602 and multiple devices implementing the memory 604. A processing unit 602 can include one or more processing cores (not shown) that operate independently of each other. Additional co-processing units, such as graphics processing unit 620 or other logic devices, also can be present in the computer; such logic devices may be located within some of the other components of the computer and shown in FIG. 6.

The memory 604 may include volatile devices (such as dynamic random access memory (DRAM) or other random access memory device), and non-volatile devices (such as a read-only memory, flash memory, and the like) or some combination of the two. The computer 600 can include additional storage (removable and/or non-removable) including, but not limited to, magnetically-recorded or optically-recorded disks or tape. Such additional storage is illustrated in FIG. 6 by removable storage 608 and non-removable storage 610. The various components in FIG. 6 are generally interconnected by an interconnection mechanism, such as one or more buses 630.

A computer storage medium is any medium in which data can be stored in and retrieved from addressable physical storage locations by the computer. Computer storage media includes volatile and nonvolatile memory devices, and removable and non-removable storage media. Memory 604 and 606, removable storage 608 and non-removable storage 610 are all examples of computer storage media. Some examples of computer storage media are RAM, ROM, EEPROM, flash memory, processor registers, or other memory technology, CD-ROM, digital versatile disks (DVD) or other optically or magneto-optically recorded storage device, magnetic cassettes, magnetic tape, magnetic disk storage or other magnetic storage devices. Computer storage media and communication media are mutually exclusive categories of media.

The computer 600 may also include communications connection(s) 612 that allow the computer to communicate with other devices over a communication medium. Communication media transmit data, such as computer program instructions, data structures, program modules or other data, over a wired or wireless substance by propagating a modulated data signal such as a carrier wave or other transport mechanism over the substance. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media include any non-wired communication media that allows propagation of signals, such as acoustic, electromagnetic, electrical, optical, infrared, radio frequency and other signals. Communications connections 612 are devices, such as a wired network interface, wireless network interface, radio frequency transceiver, e.g., Wi-Fi, cellular, long term evolution (LTE) or Bluetooth, etc., transceivers, navigation transceivers, e.g., global positioning system (GPS) or Global Navigation Satellite System (GLONASS), etc., transceivers, that interface with the communication media to transmit data over and receive data from communication media.

In a computer, example communications connections include, but are not limited to, a wireless communication interface for wireless connection to a computer network, and one or more radio transmitters for telephonic communications over cellular telephone networks, and/or. For example, a WiFi connection 672, a Bluetooth connection 674, a cellular connection 670, and other connections 676 may be present in the computer. Such connections support communication with other devices. One or more processes may be running on the computer and managed by the operating system to enable voice or data communications over such connections.

The computer 600 may have various input device(s) 614 such as a touch-based input device, pen, camera, microphone, sensors, such as accelerometers, gyroscopes, thermometers, light sensors, and the like, and so on. Output device(s) 616 such as a display, speakers, and so on may also be included. All of these devices are well known in the art and need not be discussed at length here. Various input and output devices can implement a natural user interface (NUI), which is any interface technology that enables a user to interact with a device in a "natural" manner, free from artificial constraints imposed by input devices such as mice, keyboards, remote controls, and the like.

Examples of NUI methods include those relying on speech recognition, touch and stylus recognition, gesture recognition both on screen and adjacent to the screen, air gestures, head and eye tracking, voice and speech, vision, touch, gestures, and machine intelligence, and may include the use of touch sensitive displays, voice and speech recognition, intention and goal understanding, motion gesture detection using depth cameras (such as stereoscopic camera systems, infrared camera systems, and other camera systems and combinations of these), motion gesture detection using accelerometers or gyroscopes, facial recognition, three dimensional displays, head, eye, and gaze tracking, immersive augmented reality and virtual reality systems, all of which provide a more natural interface, as well as technologies for sensing brain activity using electric field sensing electrodes (EEG and related methods).

The various storage 610, communication connections 612, output devices 616 and input devices 614 can be integrated within a housing with the rest of the computer hardware, or can be connected through various input/output interface devices on the computer, in which case the reference numbers 610, 612, 614 and 616 can indicate either the interface for connection to a device or the device itself as the case may be.

Each component (which also may be called a "module" or "engine" or the like), of a computer system such as described herein, and which operates on the computer, can be implemented using the one or more processing units or logic devices of the computer and one or more computer programs processed by the computer. Generally speaking, such modules have inputs and outputs through locations in memory or processor registers from which data can be read and to which data can be written when the module is executed by the computer. A computer program includes computer-executable instructions and/or computer-interpreted instructions, such as program modules, which instructions are processed by the computer. Generally, such instructions define routines, programs, objects, components, data structures, and so on, that, when processed by the computer, instruct the computer to perform operations on data or configure the computer to implement various components or data structures.

Alternatively, or in addition, the functionality of one or more of the various components described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

It should be understood that the subject matter defined in the appended claims is not necessarily limited to the specific implementations described above. The specific implementations described above are disclosed as examples only.

What is claimed is:

1. A computer configured to connect to a shared storage system over a computer network, the shared storage system for storing a plurality of electronic documents and being accessible to a plurality of computers over the computer network, the computer comprising:
   computer storage storing electronic documents; and
   a processing system comprising one or more processing units, the computer storage storing computer program code that, when executed by the processing system, configures the computer to be further comprising:
   an application comprising computer program instructions stored in the computer storage and executed by the processing system to process user input to modify content of an electronic document, the application comprising a graphical user interface including a document pane comprising display data representing content of the electronic document being modified and a graphical element providing access to sharing status of the electronic document being modified;
   the application, in response to an instruction to share the electronic document being modified:
      displaying a sharing interface in the graphical user interface of the application while the document pane is presenting the electronic document being modified, the sharing interface indicating one or more available shared storage systems to store the electronic document being modified,
      storing the electronic document being modified in a selected shared storage system from the one or more available shared storage systems,
      after storing the electronic document being edited in the file in the selected shared storage system, changing context of the application to indicate the electronic document being modified is stored in the selected shared storage system, and
      updating the graphical user interface to display sharing status information for the electronic document and to discontinue displaying indications for the one or more available shared storage systems while the electronic document is being displayed in the document pane of the same graphical user interface.

2. The computer of claim 1, wherein the application, in response to a determination that the electronic document being modified is already stored in the shared storage system, or after otherwise ensuring the electronic document being modified is stored in the selected shared storage system, presents in the sharing interface a graphical element in which a user can enter an indication of a user for sharing the electronic document being modified.

3. The computer of claim 1, wherein the application further stores the electronic document in a default directory in the shared storage system.

4. The computer of claim 3, wherein naming conflicts of the electronic document and other electronic documents stored in the default directory of the shared storage system are automatically resolved.

5. The computer of claim 1, wherein the application further prompts a user to enter, in the sharing interface, one or more user identifiers for one or more other users.

6. The computer of claim 5, wherein the application further receives the one or more user identifiers for the one or more other users for sharing the electronic document.

7. An article of manufacture comprising:
   a computer storage medium,
   computer program instructions stored on the computer storage medium for processing by a processing system of a computer, wherein the computer is configured to connect to a shared storage system over a computer network, the shared storage system for storing a plurality of electronic documents and being accessible to a plurality of computers over the computer network, wherein the processing system of the computer comprises a processing unit and computer storage storing electronic documents, wherein the computer program instructions, when processed by the processing system of the computer, configures the computer to be comprising:
   an application comprising computer program instructions executed by the processing system to process user input to modify content of an electronic document, the application comprising a graphical user interface including a document pane comprising display data representing content of the electronic document being modified and a graphical element providing access to sharing status of the electronic document being modified;
   the application, in response to a selection of the graphical element and an instruction to share the electronic document being modified:
      displaying a sharing interface in the graphical user interface of the application while the document pane is presenting the electronic document being modified, the sharing interface indicating one or more available shared storage systems to store the electronic document being modified,
      storing the electronic document being modified in a selected shared storage system from the one or more available shared storage systems,
      after storing the electronic document being edited in the file in the selected shared storage system, changing context of the application to indicate the electronic document being modified is stored in the selected shared storage system, and
      updating the graphical user interface to display sharing status information for the electronic document and to discontinue displaying indications for the one or more available shared storage systems while the electronic document is being displayed in the document pane of the same graphical user interface.

8. The article of manufacture of claim 7, wherein the application, in response to a determination that the electronic document being modified is already stored in the shared storage system, or after otherwise ensuring the electronic document being modified is stored in the selected shared storage system, presents in the sharing interface a graphical element in which a user can enter an indication of a user for sharing the electronic document being modified.

9. The article of manufacture of claim 7, wherein the application further stores the electronic document in a default directory in the shared storage system.

10. The article of manufacture of claim 9, wherein naming conflicts of the electronic document and other electronic documents stored in the default directory of the shared storage system are automatically resolved.

11. The article of manufacture of claim 7, wherein the application further interactively updates the sharing interface in the graphical user interface with sharing status information for the currently accessed electronic document while the electronic document is accessed by the application and displayed in the graphical user interface.

12. The article of manufacture of claim 7, wherein the application further prompts a user to enter, in the sharing interface, one or more user identifiers for one or more other users.

13. The article of manufacture of claim 12, wherein the application further receives the one or more user identifiers for the one or more other users for sharing the electronic document.

14. A computer-implemented process, performed by a computer configured to connect to a shared storage system over a computer network, the shared storage system for storing a plurality of electronic documents and being accessible to a plurality of computers over the computer network, the computer comprising computer storage storing electronic documents, the process comprising:

processing user input to modify an electronic document being modified; and displaying the modified electronic document in a graphical user interface including a document pane comprising display data representing content of the electronic document being modified and a graphical element providing access to sharing status of the electronic document being modified; and in response to an instruction to share the electronic document being modified:

displaying a sharing interface in the graphical user interface of an application while the document pane is presenting the electronic document being modified, the sharing interface indicating one or more available shared storage systems to store the electronic document being modified, storing the electronic document being modified in a selected shared storage system from the one or more available shared storage systems, after storing the electronic document being edited in the file in the selected shared storage system, changing context of the application indicate the electronic document being modified is stored in the selected shared storage system, and updating the graphical user interface to display sharing status information for the electronic document and to discontinue displaying indications for the one or more available shared storage systems while the electronic document is being displayed in the document pane of the same graphical user interface.

15. The computer-implemented process of claim 14, further comprising: in response to a determination that the electronic document being modified is already stored in the shared storage system, or after otherwise ensuring the electronic document being modified is stored in the selected shared storage system, presenting in the sharing interface a graphical element in which a user can enter an indication of a user for sharing the electronic document being modified.

16. The computer-implemented process of claim 14, further comprising storing the electronic document in a default directory in the shared storage system.

17. The computer-implemented process of claim 14, further comprising interactively updating the sharing interface in the graphical user interface with sharing status information for the currently accessed electronic document while the electronic document is accessed by the application and displayed in the graphical user interface.

18. The computer-implemented process of claim 14, further comprising prompting a user to enter, in the sharing interface, one or more user identifiers for one or more other users.

19. The computer-implemented process of claim 18, further comprising receiving the one or more user identifiers for the one or more other users for sharing the electronic document.

* * * * *